United States Patent [19]

Kantor et al.

[11] Patent Number: 5,032,669

[45] Date of Patent: Jul. 16, 1991

[54] LIQUID CRYSTALLINE POLYESTERS FORMED BY REACTION OF BIS(HYDROXYALKOXY) BIPHENYLS WITH TEREPHTHALOYL CHLORIDE

[75] Inventors: Simon W. Kantor, Agawam; Robert W. Lenz, Amherst; William J. Ward, Sunderland, all of Mass.

[73] Assignee: University of Massachusetts at Amherst, Amherst, Mass.

[21] Appl. No.: 517,118

[22] Filed: May 1, 1990

[51] Int. Cl.$^5$ .................... C08G 63/02; C08G 63/18; C07C 41/00; C07C 43/02
[52] U.S. Cl. .................... 528/176; 528/190; 528/195; 528/272; 528/298; 528/299; 568/643
[58] Field of Search ............... 528/195, 176, 190, 272, 528/298, 299

[56] References Cited

U.S. PATENT DOCUMENTS 4,791,187 12/1988 Süling et al. .................... 528/84
4,859,790 8/1989 Küpper et al. .................... 560/75

FOREIGN PATENT DOCUMENTS 1129175 10/1968 European Pat. Off. .
55-106222 8/1980 Japan .
58-217553 12/1983 Japan .
62-36392 2/1987 Japan .

*Primary Examiner*—Harold D. Anderson
*Assistant Examiner*—T. Mosley
*Attorney, Agent, or Firm*—Richard P. Fennelly; Louis A. Morris

[57] ABSTRACT

Novel liquid crystal polyesters can be formed by reaction of bis(hydroxyalkoxy)biphenyls (including the novel bis(2-hydroxybutoxy)biphenyl) with terephthaloyl chloride.

5 Claims, 1 Drawing Sheet (1a) r=2
(2a) r=4
(3a) r=6

(1a) r=2
(2a) r=4
(3a) r=6

(1b) r=2
(2b) r=4
(3b) r=6

LIQUID CRYSTALLINE POLYESTERS FORMED BY REACTION OF BIS(HYDROXYALKOXY) BIPHENYLS WITH TEREPHTHALOYL CHLORIDE

BACKGROUND OF THE INVENTION

Liquid crystals represent a novel state of matter intermediate between the crystalline and isotropic liquid states of matter. This unique behavior may lead to a variety of useful applications including the use of such materials in electrooptical devices, in thermography, etc.

Liquid crystalline (LC) polymers combine the desirable properties of macromolecules with the anisotropic properties of liquid crystals. An important application of LC polymers includes the formation of high tensile strength fibers. Another end use is the blending of such LC polyesters with existing polymers for the production of molecular composites.

Figure 1:
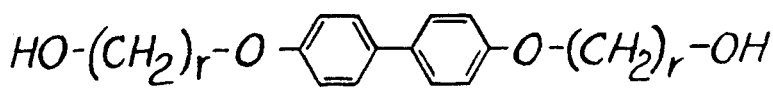

Certain monomers containing the biphenyl mesogen, as depicted in FIG. 1, which can be used to form liquid crystalline polyesters are known. Specifically, the monomer where r=2 is identified by CAS Registry No. 20994-26-7 whereas r=6 is identified by CAS Registry No. 97087-90-6. A computer search revealed the following references which appear to show the synthesis and use of one or both of these monomers as follows:

1. Sato, M. et al., "Synthesis and Liquid-Crystalline Properties of Thermotropic Homo- and Copolycarbonates", J. Polym. Sci., Part A: Polym. Chem., 26(11) 3077–3088 (1988) appears to name both monomers. The homo- and copolycarbonates described have flexible spacers between mesogens and between the carbonate linkages.

2. The monomer where r=6 is mentioned in "Combined Liquid-Crystalline Polymers with Chiral Phases 2. Lateral Substituents", by H. Kapitza et al., Makromol. Chem. 189(8) 1793–1807 (1988). The polyester-polyether polymers described therein have mesogenic groups in the main chain as well as in the side groups.

3. The monomer where r=2 is mentioned in U.S. Pat. No. 4,791,187.

4. Both monomers (r=2 and r=6) are mentioned in "Liquid Crystalline Behavior of Central Core-Type Model Compounds for Thermotropic Polycarbonates", by M. Sato et al., Makromol. Chem., Rapid Comm., 8(8), 383–386 (1987). The thermotropic polycarbonates were prepared by reaction of omega, omega'-(4,4'-biphenylenedioxy)dialkanols with n-alkyl or phenyl-chlorocarbonate.

5. M. Sato et al. in "New Liquid-Crystalline Polycarbonates from Diols Containing a Biphenyl Ring Sequence As Central Core", Makromol. Chem., Rapid Commun., 7(4), 231–234 (1986) mentions liquid crystal polycarbonates prepared by melt condensation of 6,6'-(4,4'-biphenylenedioxydihexanol (the monomer when r=6) and alkylene di-phenyl dicarbonates in the presence of zinc acetate.

6. B. Reck et al., in "Combined Liquid Crystalline Polymers: Mesogens in the Main Chain and as Side Groups", Makromol. Chem., Rapid Commun., 6(4), 291–299 (1985) shows the preparation and polymerization of the monomers where r=2 and 6 with phenylazophenoxy or biphenyloxy group containing diethyl malonate derivatives.

7. M. Kawaguchi et al. in "Synthesis and Physical Properties of Polyfunctional Methacrylates. Part 4. Synthesis and Physical Properties of Aromatic Dimethacrylate Copolymers", Dent Mater. J., 3(2), 272–279 (1984) describes copolymers of methyl methacrylate and dimethacrylates of various dihydroxy compounds, including 4,4'-(2-hydroxyethoxy) biphenyl as possible dental resonance materials. The monomer where r=2 was prepared and esterified with methacryloyl chloride.

8. Japanese Kokai No. 58/217553 (abstracted in Chem. Abstr. 101:39330m) describes thermoplastic resin compositions including those containing the methylenedianiline terminated monomer where r=2.

9. U.S. Pat. No. 3,562,335 describes 4,4'-dialkoxybiphenyls and in its disclosure shows preparation of the monomer where r=2.

More recently, U.S. Pat. No. 4,833,229 relating to a thermotropic copolyester having a nematic structure of the liquid crystalline phase issued. It was derived from a saturated aliphatic dicarboxylic acid, a 4,4'-dihydroxybiphenyl, and a p-hydroxybenzoic acid.

DESCRIPTION OF THE INVENTION

One embodiment is the novel monomer bis(2-hydroxybutoxy) biphenyl which is shown in FIG. 1 as 2a (where r=4). This monomer can be synthesized as shown in Example 2 by the reaction of 4,4'-biphenol with 4-bromobutyl acetate.

The liquid crystalline nature of these types of monomers have been previously reported, e.g., the monomer with r=6 has been characterized as displaying various smetic transitions. As will be described in greater detail below, the effect of such a smetic mesogen can be incorporated into a polymer with various ratios of terephthalic and isophthalic units to investigate the effects of non-mesogenic kinks on stabilizing the liquid crystalline state of such polymers.

Figure 2:
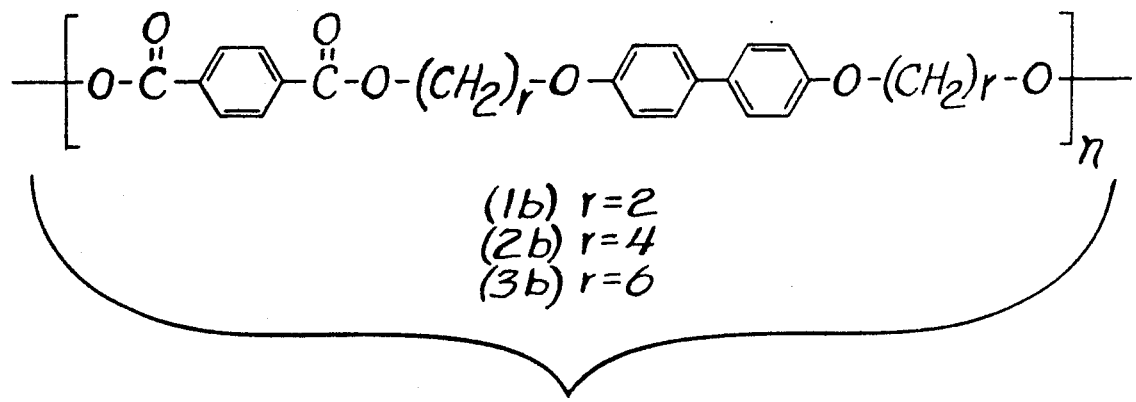

A second preferred embodiment of the present invention involves the novel polyester compositions of the general type shown in FIG. 2. However, the particular embodiments shown in the formula can more generally be depicted as

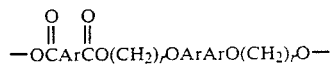

where Ar is 1,4-phenylene, ArAr is a 4,4'-biphenylene mesogenic group, and r ranges from about 2 to about 8. In the formula that is given, Ar can be substituted or unsubstituted phenyl group and ArAr indicates a biphenyl mesogenic group that can also be substituted or unsubstituted. As used herein, the term "biphenyl" is to be construed as covering two phenyl rings linked together, for example, as biphenyl rings or fused together as naphthyl rings. Exemplary substituents on either Ar or ArAr include lower alkyl, aryl, halogen, and the like.

These polymers display a nematic texture when viewed under an optical polarizing microscope and can be, for example, synthesized by reaction of the known and novel bis(hydroxy-alkoxy) biphenyls, including those shown in FIG. 1, with terephthaloyl chloride. Generally speaking, the r group in the depicted biphenyl reagent of FIG. 1 can range from about 2 to about 8. The synthesis of these novel preferred polyester compositions is illustrated in Examples 4–6 which follow and are advantageously carried out in a hydrocarbon solvent (e.g., a halogenated solvent such as tetrachlorothane) in the presence of an amine which serves as an acid acceptor (e.g., pyridine).

The instant invention is further understood by the Examples which follow.

EXAMPLE 1

This Example illustrates the preparation of bis(2-hydroxy-ethoxy)biphenyl which is Compound 1a in FIG. 1.

4,4'-Biphenol (18.6 grams, 0.1 mole) was stirred into a solution of sodium hydroxide (16.0 grams) in 200 ml of ethanol. The resulting slurry was heated to reflux, at which point 2-bromoethanol (55.0 grams, 0.044 mole) was added dropwise over a thirty minute period. The mixture was refluxed for twenty-four hours, was cooled, and was poured into a large volume of water. The resulting slurry was warmed for thirty minutes, was cooled and was filtered. The precipitate was then washed with water, then with acetone, and was recrystallized twice from dioxane to give the pure compound in 60% yield. It had a melting point of 210° C.

EXAMPLE 2

This Example illustrates preparation of bis(2-hydroxy-butoxy)biphenyl, which is compound 2a in FIG. 1.

Into a solution of 4,4'-biphenol (19.0 grams, 0.10 mole) in 100 ml of methanol was placed one equivalent of sodium methoxide, prepared from sodium and methanol immediately prior to use. The mixture was stirred a short while, and the methanol was replaced with 300 ml of dimethylformamide (DMF). To this solution was then added 4-bromobutyl acetate (60.0 grams, 0.30 mole), and the reaction mixture was heated at 60° C. for forty-eight hours, at which point the mixture was cooled and the precipitate was collected by vacuum filtration. The crude solid (25.5 grams) was then added to a solution of potassium hydroxide (20.0 grams) in ethanol-water (2:1). The reaction mixture was then heated to reflux for forty-eight hours. The mixture was then cooled and was neutralized with a dilute HCl solution. The mixture was cooled further, and the precipitate was collected and recrystallized from acetone-DMF, giving the pure product (30% overall yield) having a melting point of 193° C.

EXAMPLE 3

This Example illustrates preparation of bis(6-hydroxy-hexoxy)biphenyl, which is compound 3a in FIG. 1.

Compound 3a was prepared and purified in a manner similar to compound 1a, as described in Example 1. Thus, 4,4'-biphenol (30.0 grams, 0.16 mole) was mixed with 25 grams of NaOH in ethanol, was then reacted with 6-chlorohexanol (100 grams, 0.73 mole), to give the pure compound in 70% yield having a melting point of 175°–176° C.

EXAMPLE 4

This Example illustrates preparation of polymer 1b as shown in FIG. 2.

An amount equalling 3.843 grams of diol 1a, which was synthesized in Example 1, was dissolved in 90 ml of 1,1,2,2-tetrachloroethane and 8 ml of pyridine. The reaction mixture was warmed under an argon atmosphere and a substantially equal equivalent amount of terephthaloyl chloride (2.844 grams) was introduced to the reaction flask. The resulting mixture was stirred and heated at 100° C. for twenty-four hours. The polymer was then precipitated in a large volume of methanol, collected, and extracted with methanol, was then dried in a vacuum oven, giving the pure homo polymer in 86% yield.

Analytical calculations for (1b, $C_{24}H_{20}O_6$): C, 71.28; H, 5.00. Found: C, 71.40; H, 5.27.

EXAMPLE 5

This Example illustrates preparation of polymer 2b as shown in FIG. 2.

An amount equalling 8.868 grams of diol 2a, which was made in Example 2, was dissolved in 110 ml of 1,1,2,2-tetrachloroethane and 33 ml of pyridine. The reaction mixture was warmed under an argon atmosphere and a substantially equal equivalent amount of terephthaloyl chloride (5.499 grams) was introduced to the reaction flask. The resulting mixture was stirred and heated at 70° C. for twenty-four hours. The polymer was then precipitated in a large volume of methanol, collected, and extracted with methanol, was then dried in a vacuum oven, giving the pure homo polymer in 90% yield.

Analytical calculations for (2b, $C_{28}H_{28}O_6$): C, 73.02; H, 6.13. Found: C, 72.93; H. 6.03.

EXAMPLE 6

This Example illustrates preparation of polymer 3b as shown in FIG. 2.

An amount equalling 3.407 grams of diol 3a, made in Example 3, was dissolved in 80 ml of 1,2-dichlorethane and 3 ml of pyridine. The reaction mixture was warmed under an argon atmosphere and a substantially equal equivalent amount of terephthaloyl chloride (1.796 grams) was introduced to the reaction flask. The resulting mixture was stirred and heated at reflux temperature for twenty-four hours. The polymer was then precipitated in a large volume of methanol, collected, and extracted with methanol, then dried in a vacuum oven, giving the pure homo polymer in 75% yield.

Analytical calculations for (3b, $C_{32}H_{36}O_6$): C, 74.39; H, 7.02. Found: C, 74.25; H, 6.96.

EXAMPLE 7

This Example illustrates the preparation of a polyester from the condensation of diol 3a, as shown in FIG. 1, with adipoyl chloride.

An amount equalling 4.850 gm of diol 3a, made in Example 3, was dissolved in 75 ml of 1,2-dichloroethane and 5 ml of pyridine. The reaction mixture was warmed under an argon atmosphere and a substantially equivalent amount of terephthaloyl chloride (2.297 gm) was introduced to the reaction flask. The resulting mixture was stirred and was heated to reflux temperature for eighteen hours. The polymer was then precipitated in a large volume of methanol, was collected, and was extracted with methanol. It was then dried in a vacuum oven, giving a substantially pure homopolymer in 87% yield.

The analytical calculation for ($C_{30}H_{40}O_6$): C, 72.55; H, 8.12. Found: C, 72.85; H, 8.04.

EXAMPLE 8

This Example illustrates preparation of the type of polymers described above where monomer 3a is condensed with various ratios of terephthaloyl chloride and isophthaloyl chloride. This synthesis is for a polymer having a ratio of terephthalic to isophthalic units of 2:1.

An amount of monomer 3a (1.0066 gm), terephthaloyl chloride (0.3530 gm), and isophthaloyl chloride (0.17467 gm) were placed in an argan-purged Schlenk tube. The tube was then charged with 10 ml of 1-chloronaphthalene. A condenser was attached to the tube and a slight purge of argon was applied throughout the reaction. The mixture was heated to 170° C. where a yellow solution persisted for one hour. The clear solution was then slowly heated to 210° C. over a three hour period and was then held at this temperature until the evolution of HCl ceased (about two days). The solution was then diluted with 20 ml of 1,2-dichloroethane and was then precipitated in methanol. The solid polymer was collected, was extracted with methanol, and was allowed to dry in a vacuum oven at 110° C. for three days giving the polymer in 95% yield.

Analytical calculation for ($C_{32}H_{36}O_6$): C, 74.39; H, 7.02. Found: C, 74.18; H, 6.95.

RESULTS

The inherent viscosity measurements of the synthesized polymers, (30° C. in 1,1,2,2-tetrachloroethane), gave values typically ranging from 0.50 to 1.18 dL/G. The values were: 1b 0.70; 2b 0.78; and 3b 1.17. The inherent viscosity for a product having the general structure

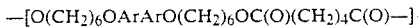

—[O(CH$_2$)$_6$OArArO(CH$_2$)$_6$OC(O)(CH$_2$)$_4$C(O)—]

with Ar being phenyl, was 0.73 dL/G. Polymers (1b, 2b, 3b) displayed a dense schlieren texture under an optical polarizing microscope, which is best observed from cooling from the isotropic phase. Thermal transition data, as measured by DSC and confirmed by optical microscopy, are as follows: for 1b, fusion begins at 214° C., clearing temperature=224° C.; for 2b, fusion begins at 160° C., clearing temperature=182° C.; for 3b, fusion begins at 120° C., clearing temperature=161° C. The proton NMR spectra of the polymers are consistent with the structures.

In other results, the 50/50 random copolymer, derived from monomers 1a and 3a, was prepared in similar fashion to the homopolymers, and found to be pure by elemental analysis. Surprisingly the copolymer does not show any birefringent textures. The results are somewhat unexpected.

The aliphatic analog, depicted by the general structural formula shown above, derived from monomer 3a was prepared in the usual manner and was found to be pure by elemental analysis. A single endothermic peak was observed by DSC at 132° C. This polymer appeared to be much more crystalline in nature as compared to the other polymers shown herein. It could not be easily characterized as liquid crystalline.

Inherent viscosity measurements, as previously described, were taken on polymers 4a–4d as also described above. The values were: 4a, 1.62; 4b, 1.50; 4c, 1.53; and 4d, 1.58. The polymers displayed similar textures, as also described before, although the development of textures was hindered by the higher viscosity of these materials. Thermal transition data, as measured by DSC and confirmed by optical miscroscopy, revealed isotropization transition for 4a at 149° C.; for 4b at 146° C.; for 4c at 118° C.; and for 4d at 121° C. and sharp monotropic transition for 4a at 121° C.; for 4b at 108° C.; for 4c at 108° C.; and for 4d at 112° C. The proton NMR spectra of the polymers was consistent with the structures and compositions. The x-ray diffraction studies on drawn fibers indicated enhanced development of the liquid crystalline state and suppression of the crystalline state with increasing content of isophthalic units.

The foregoing illustrate certain preferred embodiments of the invention and, for that reason, should not be construed in a limiting sense. The scope of protection sought is set forth in the claims which follow.

We claim:

1. A polyester composition having the repeating unit

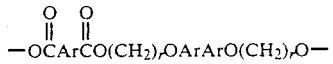

—OCArCO(CH$_2$)$_r$OArArO(CH$_2$)$_r$O— where Ar is 1,4-phenylene, ArAr is a 4,4'-diphenylene mesogenic group, and r ranges from about 2 to about 8.

2. A composition as claimed in claim 1 where r is 2.
3. A composition as claimed in claim 1 where r is 4.
4. A composition as claimed in claim 1 where r is 6.
5. A composition as claimed in claim 1 wherein Ar is unsubstituted phenylene and ArAr is unsubstituted biphenylene.

* * * * *